(12) United States Patent
Stanton et al.

(10) Patent No.: US 6,717,951 B2
(45) Date of Patent: *Apr. 6, 2004

(54) METHOD AND APPARATUS FOR DETERMINING PRIORITY OF NETWORK PACKETS

(75) Inventors: Kevin B. Stanton, Hillsboro, OR (US); Jens T. Brage, Frederiksberg (DK)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,460

(22) Filed: Dec. 29, 1999

(65) Prior Publication Data

US 2002/0150089 A1 Oct. 17, 2002

(51) Int. Cl.7 .............................. H04L 12/56
(52) U.S. Cl. ...................... 370/418; 370/389
(58) Field of Search ................ 370/229–240, 370/252–253, 412–418, 428–429, 389–392, 539, 541

(56) References Cited

U.S. PATENT DOCUMENTS

| | | | | |
|---|---|---|---|---|
| 4,630,258 A | * | 12/1986 | McMillen et al. | 370/411 |
| 4,821,258 A | | 4/1989 | Fraser | |
| 5,235,595 A | * | 8/1993 | O'Dowd | 370/392 |
| 5,455,825 A | | 10/1995 | Lauer et al. | |
| 5,517,617 A | * | 5/1996 | Sathaye et al. | 709/222 |
| 5,557,608 A | * | 9/1996 | Calvignac et al. | 370/389 |
| 5,617,416 A | * | 4/1997 | Damien | 370/391 |
| 5,724,358 A | * | 3/1998 | Headrick et al. | 370/418 |
| 5,812,550 A | * | 9/1998 | Sohn et al. | 370/395 |
| 5,859,835 A | * | 1/1999 | Varma et al. | 370/229 |
| 5,940,390 A | | 8/1999 | Berl et al. | |
| 6,088,356 A | * | 7/2000 | Hendel et al. | 370/392 |
| 6,094,435 A | * | 7/2000 | Hoffman et al. | 370/414 |
| 6,104,700 A | * | 8/2000 | Haddock et al. | 370/412 |
| 6,229,789 B1 | * | 5/2001 | Simpson et al. | 370/235 |
| 6,487,212 B1 | * | 11/2002 | Erimli et al. | 370/413 |
| 6,490,640 B1 | * | 12/2002 | Johansson | 710/52 |
| 6,501,757 B1 | * | 12/2002 | Kamaraj et al. | 370/395.41 |

FOREIGN PATENT DOCUMENTS

| | | | |
|---|---|---|---|
| EP | 0393898 A | 10/1990 | |
| EP | 0753981 A | 1/1997 | |
| GB | 2308959 A | 7/1997 | |
| GB | 2318250 A | 4/1998 | |
| JP | 11331257 A | * 11/1999 | ........... H04L/12/56 |

* cited by examiner

Primary Examiner—Chi Pham
Assistant Examiner—Keith M. George
(74) Attorney, Agent, or Firm—Blakely, Sokoloff, Taylor & Zafman LLP (57) ABSTRACT

A network packet switching engine is described. The switching engine generates a priority to be associated with a packet of data. The switching engine receives a packet of data. Based on information in the packet (e.g., source address, destination address, tag priority, receive port) and other information (e.g., candidate priorities, a set of flags, and a priority table), the switching engine determines a priority for the packet.

26 Claims, 5 Drawing Sheets

METHOD AND APPARATUS FOR DETERMINING PRIORITY OF NETWORK PACKETS

FIELD OF THE INVENTION

The invention relates to network management. More particularly, the invention relates to a programmable network switching engine.

BACKGROUND OF THE INVENTION

Prioritization of network packets is typically used by network components such as, for example, network switches and/or routers to provide more efficient use of network bandwidth. By having a priority associated with the packets, network components can expedite packets having a higher priority ahead of packets with lower priority.

Typical network prioritization schemes are either hardwired, and therefore inflexible, or performed by general purpose processors, and therefore processor-intensive and slow. Hardwired prioritization schemes are inflexible because the scheme must be determined and built into the network components that are to use the prioritization scheme. The hardwired solutions can be expensive and difficult to upgrade because new prioritization schemes require hardware replacement and potential upgrade incompatibilities, which can make prioritization scheme changes prohibitively expensive.

Programmable prioritization schemes rely on general purpose processors to execute a sequence of instructions to prioritize network packets. The general purpose processor is used for other network-related purposes and the addition of prioritization duties can result in unacceptably slow performance from the device (e.g., a network switch) prioritizing the packets. Thus, prior art prioritization schemes are inefficient and/or inflexible.

SUMMARY OF THE INVENTION

A packet of data is received. A set of candidate priorities and a set of flags are received. A set of one or more instructions to operate on the set of candidate priorities and the set of flags is executed. A priority is generated for the packet of data based on execution of the set of one or more instructions.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Methods and apparatuses for prioritizing network packets are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A network packet switching engine is described. The switching engine generates a priority to be associated with a packet of data. The switching engine receives a packet of data. Based on information in the packet (e.g., source address, destination address, tag priority, receive port) and other information (e.g., a set of flags, and a priority table), the switching engine determines a priority for the packet. Because the priority determination is programmable, priority determination is flexible and easily upgraded. Because priority determination is not made by a general purpose processor that performs other networking tasks and because the priority machine can be streamlined and parallelized, overall performance is maintained.

Figure 1:
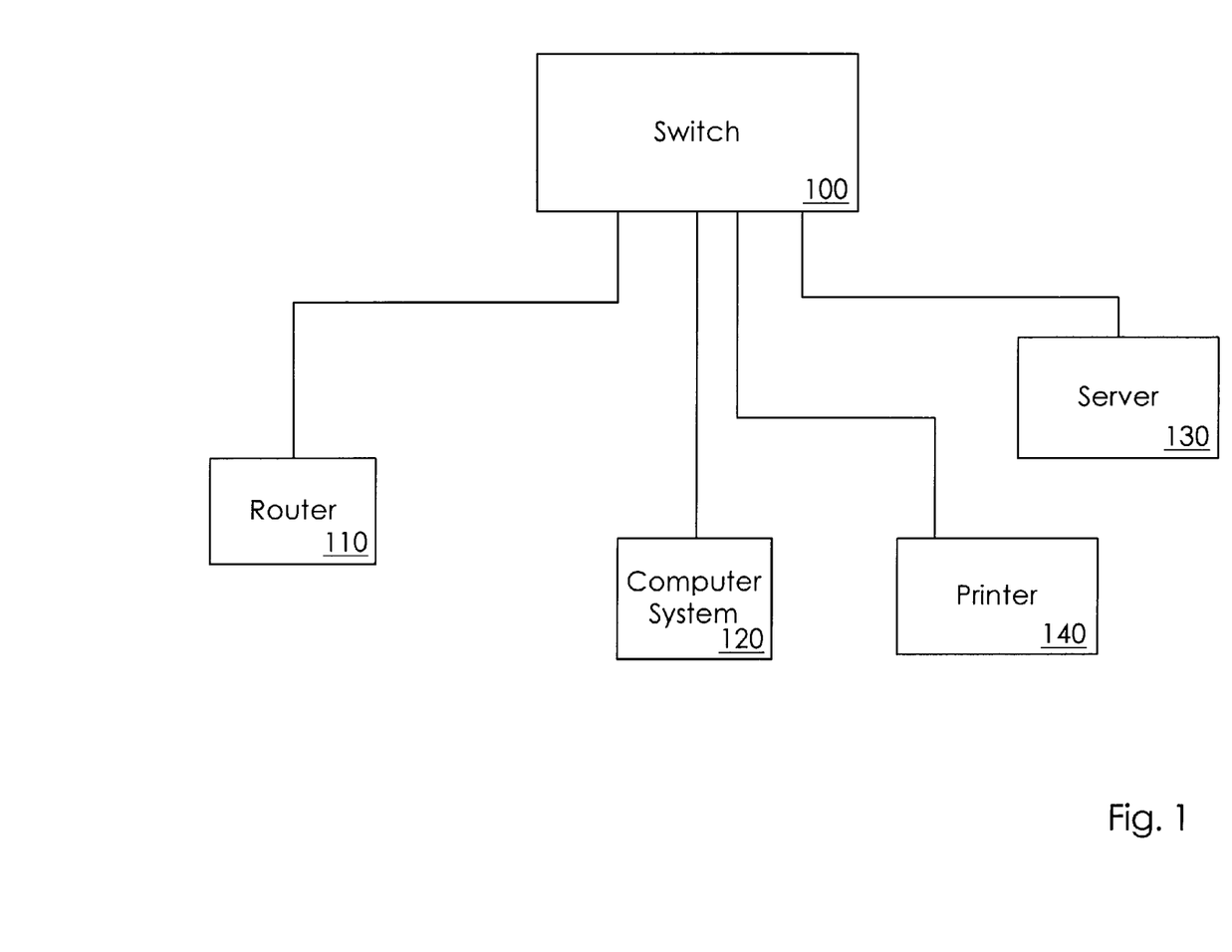
FIG. 1 is a block diagram of one embodiment of a network configuration.

FIG. 1 is a block diagram of one embodiment of a network configuration. For reasons of simplicity, the network configuration of FIG. 1 includes only four compounds coupled to a switch; however, any number of devices (e.g., switches, routers, servers, clients, printers) can be interconnected to form a network. Such network configurations are known in the art.

In general, switch 100 is a device that selects a path, or circuit, for sending a unit of data to its next destination. As used herein, a unit of data is referred to as a "packet" of data; however, use of the term packet is not intended to imply use of any particular protocol.

In the example of FIG. 1, router 110 is coupled to switch 100. In general, a router is a device or, in some cases, software in a computer system, that determines the next network point to which a packet should be forwarded toward its destination. The router is connected to at least two networks (not shown in FIG. 1) and decides which network should receive a packet based on the known configuration of the coupled networks. Typically, a router is located at any juncture of networks or gateway (not shown in FIG. 1). In some configurations, a router can be included as part of a network switch.

In operation, router 110 creates or maintains a table of the available routes and their conditions and uses this information along with distance and cost algorithms to determine the best route for a given packet. Typically, a packet may travel through a number of network points with routers before arriving at its destination. Various uses and configurations of routers are known in the art.

Computer system 120 is coupled to switch 100. Computer system 120 represents a broad group of computing devices (e.g., desktop computers, laptop computers, thin clients, specialized devices) that can send and/or receive data packets over a network. Server 130 is also coupled to switch 100. Server 100 provides data and/or services to other networked devices.

Printer 140 is coupled to switch 100. Printer 140 provides printing services to networked devices and is intended to represent the general category of similar devices that can be coupled to a network (e.g., facsimile machines, digital copiers). Additional and/or different devices can also be included in networks.

Figure 2:
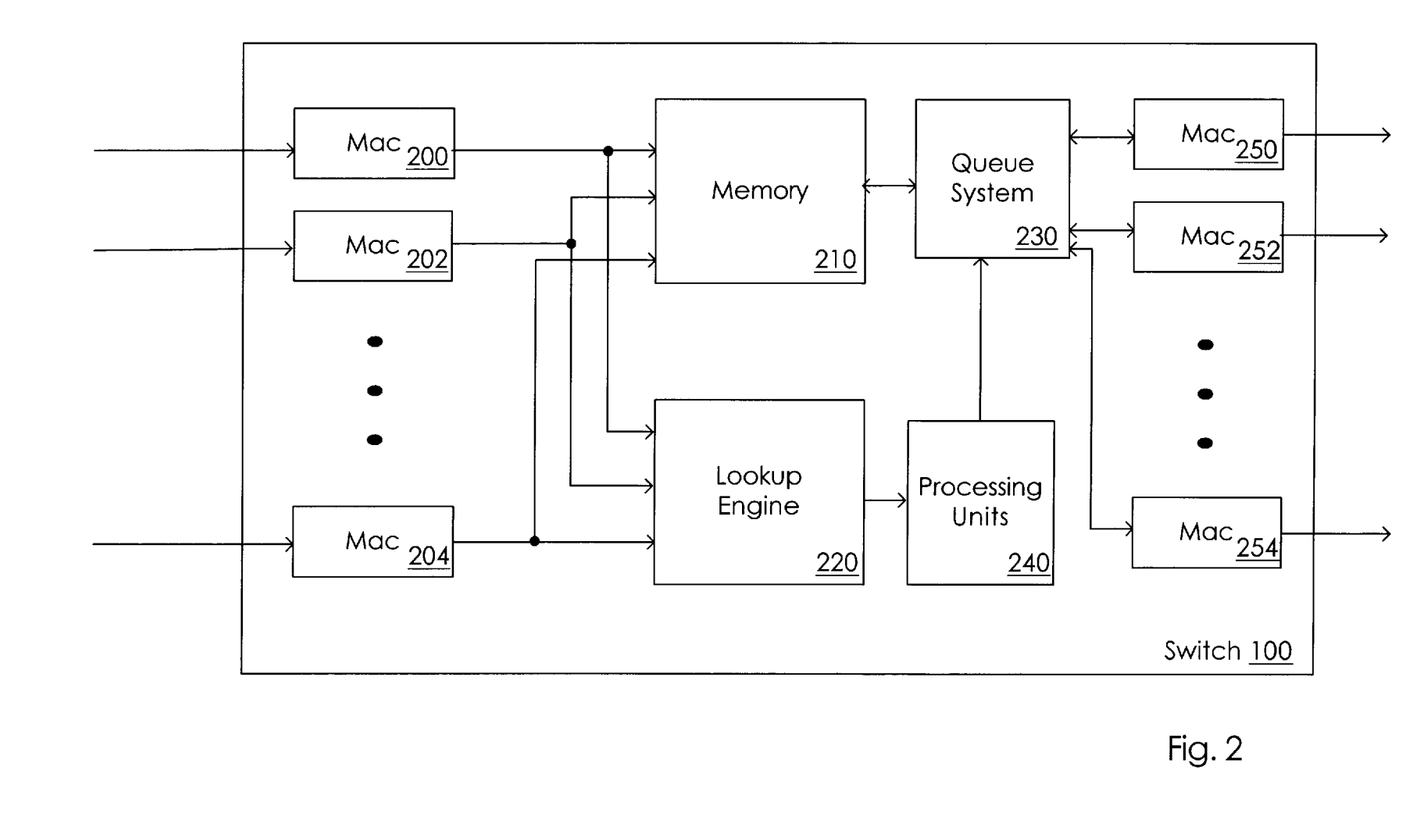
FIG. 2 is a block diagram of one embodiment of a network switch.

FIG. 2 is a block diagram of one embodiment of a network switch. Switch 100 includes multiple media access controllers (MACs) (e.g., 200, 202, 204) that are coupled to input ports to receive packets of data from a network (not shown in FIG. 2). Packets of data received by the MACs are forwarded to memory 210 and to lookup engine 220. Memory 210 stores packets of data for processing and/or forwarding by switch 100.

Lookup engine 220 stores information related to packet processing that is used by components of switch 100 to process packets received by the input ports. In one embodiment, lookup engine 220 provides a set of candidate priorities, a set of flags, and/or a priority mapping table to processing units 240 for processing of data packets (e.g., determining a priority for individual packets). In one embodiment, lookup engine 220 provides the candidate priorities and set of flags based on information related to the packet (e.g., source address, destination address, tag priority (if any), receive port). In one embodiment, the information provided by lookup engine 220 is programmable such that the values/meanings associated with the information provided by lookup engine 220 can be programmed.

Processing units 240 includes one or more processing units for processing data packets stored in memory 210. One embodiment of a priority processing unit is described in greater detail below; however, additional and/or different processing units, for example, a destination processing unit, can also be included in processing units 240.

Queue system 230 stores packets to be forwarded by switch 100. In one embodiment queue system 230 includes a set of queues equal in number to the number of possible priority levels times the number of output ports of switch 100; however, any number of queues can be provided by queue system 230. Multiple MACs (e.g., 250, 252, 254) are coupled to queue system 230 to receive packets to be forwarded through corresponding output ports. In one embodiment, the output MACs are also coupled to memory 210 (connection not shown in FIG. 2).

In one embodiment, processing units 240 provide priority and other processing for packets of data stored in memory 210. As processing is completed the packets are sent to queue system 230. The processed packets are stored by queue system 230 until forwarded to the appropriate network device (not shown in FIG. 2) through the output ports of switch 100.

Figure 3:
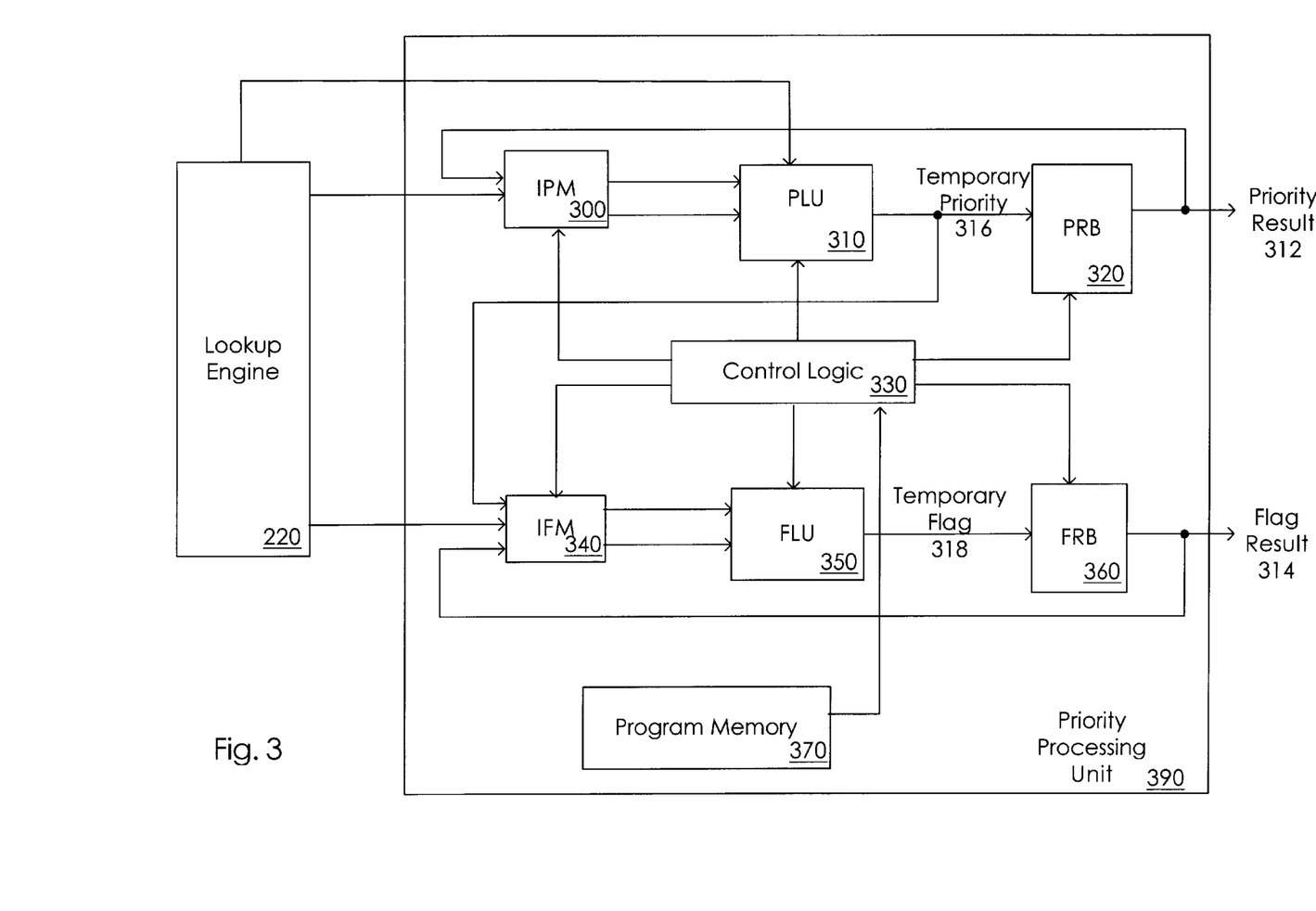
FIG. 3 is a block diagram of one embodiment of a lookup engine and a priority processing unit.

FIG. 3 is a block diagram of one embodiment of a lookup engine and a priority processing unit. Lookup engine 220 provides information to priority processing unit (PPU) 390 as described above with respect to FIG. 2. In one embodiment, PPU 390 generates two output signals, labeled PRIORITY RESULT 312 and FLAG RESULT 314 in FIG. 3. Each output can include one or more bits indicating the result generated by PPU 390.

To generate the PRIORITY RESULT signal, input priority multiplexer (IPM) 300 receives a set of candidate priorities from lookup engine 220. In one embodiment, IPM 300 passes two candidate priorities to priority logic unit (PLU) 310. A different number of candidate priorities can be passed by IPM 300. In one embodiment, the candidate priorities provided by lookup engine 220 represent the potential priorities that can be assigned to an associated packet of data. Any criteria (e.g., packet destination, network bandwidth, time of day) can be used to provide the potential priorities. In one embodiment, the criteria used and the priorities to be provided by lookup engine 220 can be modified by programming lookup engine 220. Programming can be accomplished by any manner known in the art.

In one embodiment, PLU 310 performs arithmetic operations on the candidate priorities received from IFM 300. PLU 310 sends the resultant temporary priority 316 to priority register bank (PRB) 320, which is a set of one or more general purpose priority registers. In one embodiment, PLU 310 provides the following functions: copy a priority, determine a maximum priority from the candidate priorities received, determine a minimum priority from the candidate priorities received, convert a priority to a priority by performing a lookup in a priority table provide by lookup engine 220. Other operations, for example, addition, subtraction, multiplication, can be performed by PLU 310.

In one embodiment, input flag multiplexer (IFM) 340 receives a set of one or more flags from lookup engine 220. The flags received from lookup engine 220 are used to guide the operation of choosing or calculating a final priority. In addition, a flag can be passed out of the PPU such that some extra operation can be performed by the queue system. As with the potential priorities, any criteria can be used to select the flags to be provided by lookup engine 220. The flags provided by lookup engine 220 are also programmable.

In one embodiment, flag logic unit (FLU) 350 performs Boolean operations on the candidate flags received from 1PM 340. FLU 350 sends the resultant temporary flag 318 to flag register bank (FRB) 360, which is a set of one or more general purpose flag registers. In one embodiment, FLU 350 provides the following functions: AND, OR, XOR, XNOR, NOR, NAND on either the argument of the inverse of the argument. Other Boolean operations can be performed by FLU 350.

In one embodiment, control logic 330 executes one or more instructions received from program memory 370 to control IPM 300, PLU 310, PRB 320, IFM 340, FLU 350 and FRB 360. Program memory can also be included in control logic 330. In one embodiment, the instructions executed by control logic 330 allow priority processing and flag processing to be performed in parallel; however, priority results can be used to determine a flag result, which cannot be performed in parallel.

The instructions received and executed by control logic 330 can be different for different types of packets. For example, a flag associated with a packet, or a port through which a packet is received can be used to determine the instructions to be executed for determining the priority of the packet.

In one embodiment, PRB 320 and FRB 360 include multiple general purpose registers that can be used to store a set of priorities and flags, respectively. The PRIORITY RESULT and the FLAG RESULT are taken from register zero in PRB 320 and register zero in FRB 360, respectively. In one embodiment, PRB 320 is coupled to IPM 300 to provide feedback, if necessary, for priority processing. Similarly, FRB 360 is coupled to IFM 340 to provide feedback, if necessary, for flag processing. In one embodiment,the FLAG RESULT is used to determine whether the PRIORITY RESULT is stored in the PRB 320 register specified by the instruction.

Figure 4:
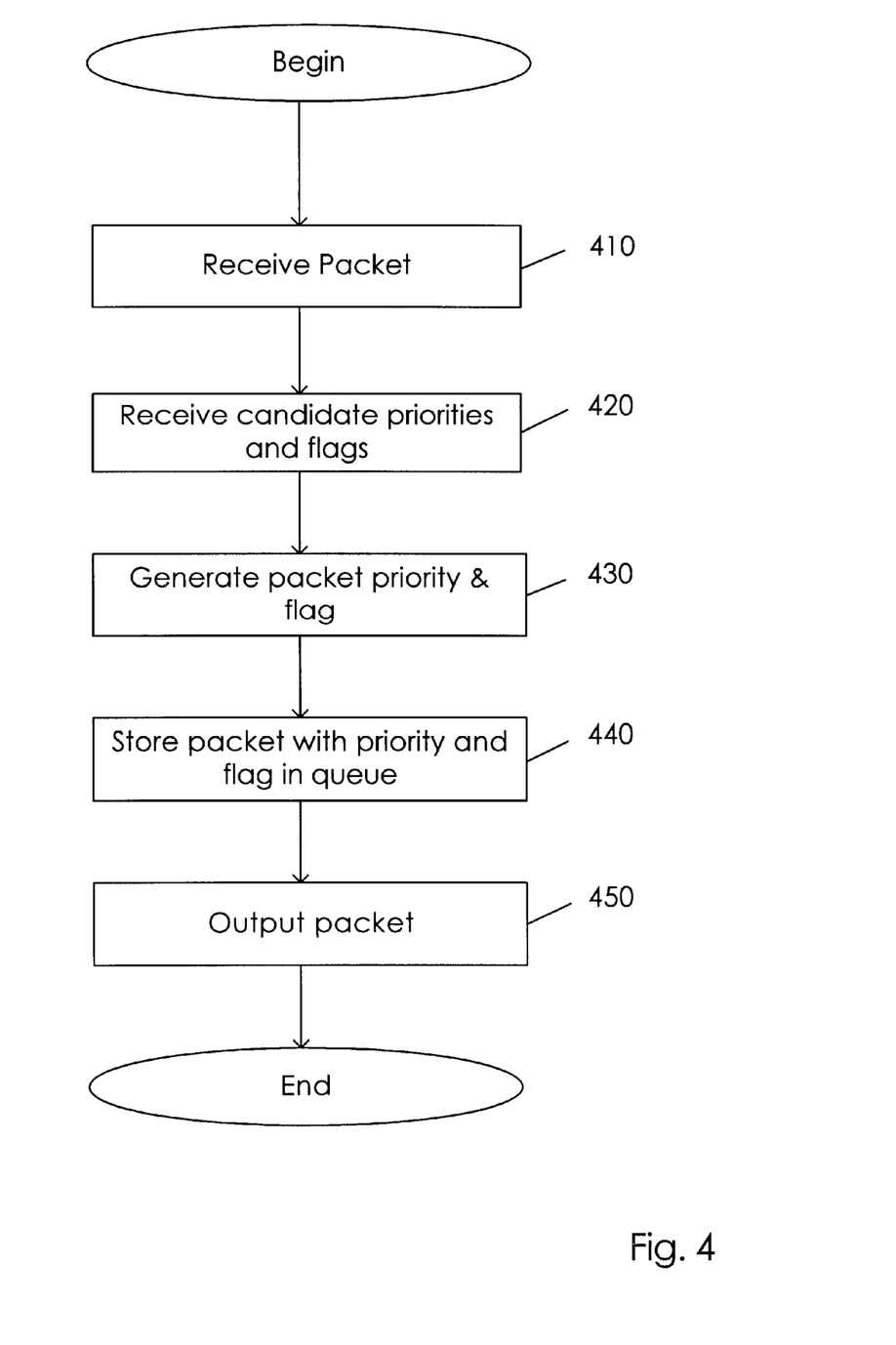
FIG. 4 is a flow chart for one embodiment of network packet prioritization.

FIG. 4 is a flow chart for one embodiment of network packet prioritization. A packet of data is received by a network device tat prioritizes packets at 410. The packet can be received, for example, through a media access controller or other device. In one embodiment, a network switch performs prioritization; however, other devices can perform prioritization as described. In one embodiment, the packet is received by a network switch and stored in memory. A pointer or other indication to the storage location of the packet is sent to a prioritization processing unit that performs the prioritization operations.

The prioritization processing unit receives a set of candidate priorities and possibly a set of flags at 420. In one embodiment, the set of candidate priorities and the possible set of flags is provided by a lookup engine within the network switch; however, the set of candidate priorities and/or set of flags can be provided by another component, either internal or external to the network switch.

Packet priority and/or a flag are generated at 430. In one embodiment, the priority processing unit generates a packet priority as a result of one or more arithmetic operations on the set of candidate priorities and the set of flags and a flag as a result of one or more Boolean operations on the set of candidate flags. In alternate embodiments, only a priority is generated. Other types of operations can also be used to generate the packet priority and/or the flag.

The packet, or a pointer to the packet, along with the priority and/or flag generated by the priority processing unit are stored in a queue at 440. In one embodiment, each output port has a set of associated queues and packets to be output by a particular port at a particular priority are stored in the corresponding queue. Other output configurations can also be used.

The packet is output at 450. In one embodiment, packets are output by a media access controller associated with one or more output ports. The media access controllers retrieve the packet data from memory and forward the packet data along with the corresponding priority to the network directed to the next network hop for the packet. If the prioritization scheme described is performed by a general-purpose processor the time required to perform the associated calculations would be longer or the process would be more complex, and therefore more expensive, than would otherwise be used.

Figure 5:
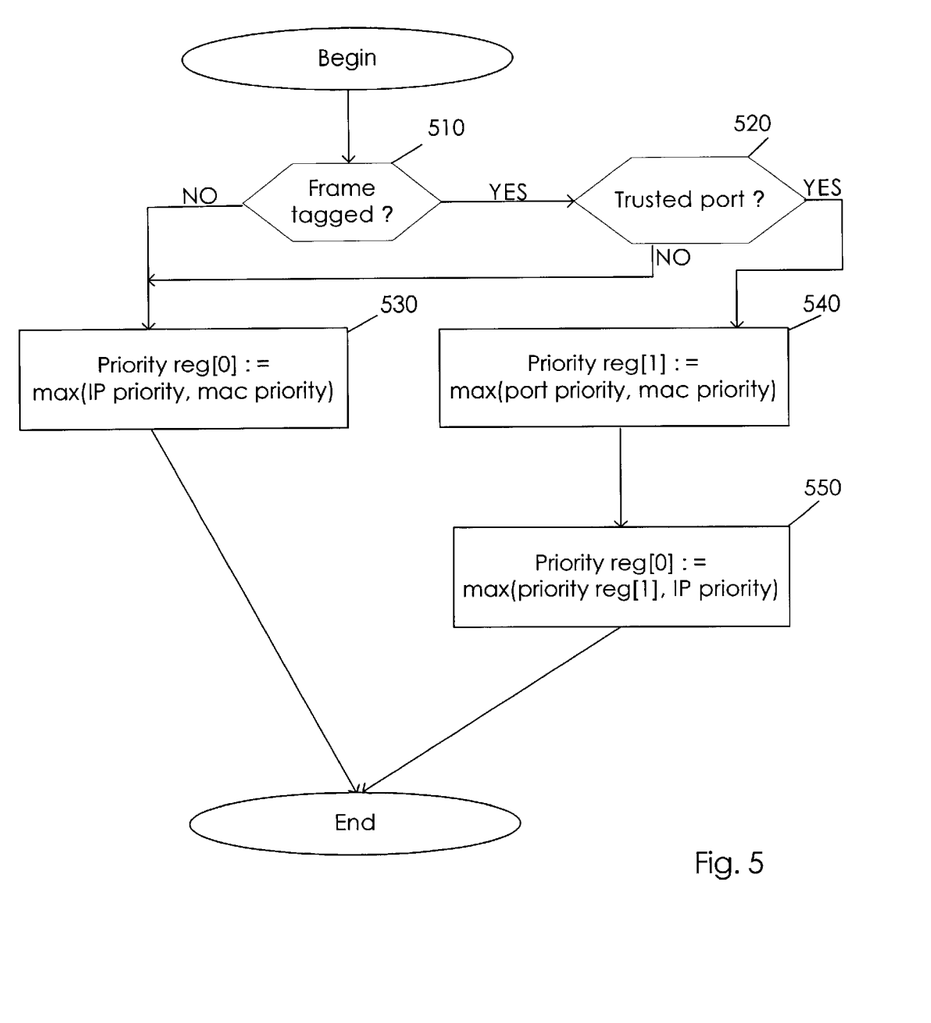
FIG. 5 is a flow chart for an exemplary PPU program for determining a priority of a network packet.

FIG. 5 is a flow chart for an exemplary PPU program for determining a priority of a network packet. In one embodiment, the PPU program of FIG. 5 is executed by control logic 330 to operate on a packet stored in memory 210. In alternate embodiments, the packet can be stored in a buffer or other memory.

Control logic 330 determines whether the frame is tagged at 510. If the frame is not tagged at 510, priority register zero stores the greater of the IP priority of the MAC priority associated with the packet at 530. In one embodiment, the IP priority and the MAC priority are received by PLU 310 from lookup engine 220.

If the frame is tagged at 510 and control logic 330 determines that the frame was not received via a trusted port at 520, priority register zero stores the greater of the IP priority or the MAC priority associated with the packet at 530. If the frame is tagged at 510 and determined to have been received via a trusted port at 530, priority register one stores the greater of the port priority or the MAC priority associated with the packet at 540. In one embodiment, the IP priority and the MAC priority are received by PLU 310 from lookup engine 220.

Priority register zero stores the greater of the priority stored in priority register one and the IP priority at 550. At the end of the exemplary program of FIG. 5, the priority stored in priority register zero is the PRIORITY RESULT of FIG. 3. Thus, the exemplary program of FIG. 5 provides a priority for a frame based on multiple candidate priorities as determined by arithmetic operations performed by PLU 310. The exemplary program of FIG. 5 is intended as a single example of the types of priority processing programs that can be provided by the architecture described herein. Those of ordinary skill in the art should realize that a large number of programs can be designed and executed to determine priorities for network packets.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A network switching engine comprising:
    a priority logic unit to receive a set of candidate priorities from a coupled lookup engine, the priority logic unit to perform arithmetic operations on the set of candidate priorities to generate a priority result for a packet of data;
    a flag logic unit, also responsive to the lookup engine, to receive a set of flags from the lookup engine, and perform boolean operations on the set of flags to generate a flag result for the packet of data; and
    a set of priority registers to receive the priority result from the priority logic unit, the set of priority registers coupled to provide feedback to the priority logic unit.

2. The network switching engine of claim 1, wherein the flag result is included in the packet of data when the packet of data is forwarded to a network device coupled to the network switching engine.

3. The network switching engine of claim 1, wherein the arithmetic operations performed by the priority logic unit are selected from a plurality of possible operations including copy priority, max priority, min priority, and priority table conversion.

4. The network switching engine of claim 1, wherein the set of flags indicate a trusted status of the packet of data.

5. The network switching engine of claim 1, wherein at least one of the set of flags is included in the packet of data.

6. The network switching engine of claim 1, wherein the set of candidate priorities comprises at least three priority candidates.

7. The network switching engine of claim 1, wherein the set of flags comprises at least three flag candidates.

8. The network switching engine of claim 1, wherein the set of priority candidates and set of flags are generated by the lookup engine by analyzing at least a subset of the packet of data.

9. The network switching engine of claim 8, wherein generation of one or more of the priority candidates and flags is based, at least in part, on one or more of a source information, destination information, tag priority information, or receive port information identified within the packet of data.

10. The network switching engine of claim 1, wherein the priority result generated by the priority logic unit is a temporary priority.

11. The network switching engine of claim 10, wherein the flag result generated by the flag logic unit is a temporary flag.

12. The network switching engine of claim 11, further comprising a priority processing unit to select a resultant priority by selectively applying the temporary flag to the temporary priority.

13. The network switching engine of claim 11, further comprising a priority processing unit to promote the temporary priority to the resultant priority without regard to the temporary flag.

14. A network switching engine comprising:
- a priority logic unit to receive a set of candidate priorities from a coupled lookup engine, the priority logic unit to perform arithmetic operations on the set of candidate priorities to generate a priority result for a packet of data;
- a flag logic unit, also responsive to the lookup engine, to receive a set of flags from the lookup engine, and perform boolean operations on the set of flags to generate a flag result for the packet of data; and
- a set of flag registers to receive the flag result from the flag logic unit, the set of flag registers coupled to provide feedback to the flag logic unit.

15. The network switching engine of claim 14, wherein the flag result is included in the packet of data when the packet of data is forwarded to a network device coupled to the network switching engine.

16. The network switching engine of claim 14, wherein the set of flags indicate a trusted status of the packet of data.

17. The network switching engine of claim 14, wherein at least one of the set of flags is included in the packet of data.

18. The network switching engine of claim 14, wherein the set of candidate priorities comprises at least three priority candidates.

19. The network switching engine of claim 14, wherein the set of flags comprises at least three flag candidates.

20. The network switching engine of claim 14, wherein the set of priority candidates and set of flags are generated by the lookup engine by analyzing at least a subset of the packet of data.

21. The network switching engine of claim 20, wherein generation of one or more of the priority candidates and flags is based, at least in part, on one or more of a source identifier, a destination identifier, a tag priority of the packet, or receive port information.

22. The network switching engine of claim 14, wherein the flag result generated by the flag logic unit is a temporary flag.

23. The network switching engine of claim 22, wherein the priority result generated by the priority logic unit is a temporary priority.

24. The network switching engine of claim 23, further comprising a priority processing unit to select a resultant priority by selectively applying the temporary flag to the temporary priority.

25. The network switching engine of claim 23, further comprising a priority processing unit to promote the temporary priority to the resultant priority without regard to the temporary flag.

26. The network switching engine of claim 14, further comprising a set of priority registers to receive the priority result from the priority logic unit, the set of priority registers coupled to provide feedback to the priority logic unit.

* * * * *

UNITED STATES PATENT AND TRADEMARK OFFICE
CERTIFICATE OF CORRECTION

PATENT NO. : 6,717,951 B2
DATED : April 6, 2004
INVENTOR(S) : Stanton et al.

It is certified that error appears in the above-identified patent and that said Letters Patent is hereby corrected as shown below:

Column 2,
Line 29, delete "compounds" and insert -- components --.

Column 4,
Line 6, delete "IFM" and insert -- IPM --.
Line 28, delete "1PM" and insert -- IFM --.
Line 65, delete "tat" and insert -- that --.

Signed and Sealed this

First Day of June, 2004

JON W. DUDAS
*Acting Director of the United States Patent and Trademark Office*